United States Patent
Ronen (10) Patent No.: US 12,436,062 B2
(45) Date of Patent: Oct. 7, 2025

(54) TECHNIQUES FOR EXAMINATION OF LIGHT OPTICAL ELEMENTS

(71) Applicant: Lumus Ltd., Ness Ziona (IL)

(72) Inventor: Eitan Ronen, Rechovot (IL)

(73) Assignee: Lumus Ltd., Ness Ziona (IL)

( * ) Notice: Subject to any disclaimer, the term of this patent is extended or adjusted under 35 U.S.C. 154(b) by 0 days.

(21) Appl. No.: 18/998,074

(22) PCT Filed: Jul. 31, 2023

(86) PCT No.: PCT/IB2023/057754
§ 371 (c)(1),
(2) Date: Jan. 23, 2025

(87) PCT Pub. No.: WO2024/028746
PCT Pub. Date: Feb. 8, 2024

(65) Prior Publication Data
US 2025/0264369 A1      Aug. 21, 2025

Related U.S. Application Data

(60) Provisional application No. 63/393,994, filed on Aug. 1, 2022.

(51) Int. Cl.
*G01M 11/02*      (2006.01)
(52) U.S. Cl.
CPC .............. *G01M 11/0207* (2013.01)
(58) Field of Classification Search
CPC ............................... G01M 11/0207
(Continued)

(56) References Cited

U.S. PATENT DOCUMENTS

| 3,829,197 A | 8/1974 | Thelen |
| 3,969,023 A | 7/1976 | Brandt et al. |

(Continued)

FOREIGN PATENT DOCUMENTS

| CN | 202757593 U | 2/2013 |
| CN | 106054292 A | 10/2016 |

(Continued)

OTHER PUBLICATIONS

International Search Report and Written Opinion issued for corresponding International Publication No. PCT/IB2023/057754, mailed Oct. 17, 2023.

(Continued)

*Primary Examiner* — Tri T Ton
(74) *Attorney, Agent, or Firm* — Renner, Otto, Boisselle & Sklar, LLP (57) ABSTRACT

Examining a light optical element (LOE) may include placing a first slit optically between a projector configured to emit light and the LOE's first major surface and placing a second slit optically between the LOE's second major surface and a detector. Facet parallelism between two facets may be deduced based on a shift of the image reflected from the first facet to the second facet relative to light transmitted normal to the first and second major surfaces through a portion of the substrate not including a facet. Facet refractive index homogeneity or deviation may be deduced based on the light transmitted through the facet relative to light transmitted normal to the first and second major surfaces through a portion of the substrate not including a facet.

8 Claims, 9 Drawing Sheets

(58) Field of Classification Search
USPC ........................................................ 356/124
See application file for complete search history.

(56) References Cited

U.S. PATENT DOCUMENTS

| | | | |
|---|---|---|---|
| 4,056,323 | A | 11/1977 | Ludman |
| 4,720,189 | A | 1/1988 | Heynen et al. |
| 6,239,771 | B1 | 5/2001 | Usuki et al. |
| 6,483,113 | B1 | 11/2002 | Sealy et al. |
| 6,879,443 | B2 | 4/2005 | Spitzer et al. |
| 7,420,691 | B2 | 9/2008 | Fukui |
| 7,612,879 | B2 | 11/2009 | Stumpe et al. |
| 7,724,409 | B2 | 5/2010 | Lin et al. |
| 7,808,625 | B2 | 10/2010 | Nakamura et al. |
| 7,869,128 | B2 | 1/2011 | Yamaguchi et al. |
| 8,016,428 | B2 | 9/2011 | Kasazumi et al. |
| 9,311,883 | B2 | 4/2016 | Cajigas et al. |
| 9,569,897 | B2 | 2/2017 | Miyawaki et al. |
| 9,638,920 | B2 | 5/2017 | Bohn |
| 9,709,809 | B2 | 7/2017 | Miyawaki et al. |
| 10,175,141 | B2 | 1/2019 | Franz |
| 10,198,865 | B2 | 2/2019 | Kezele et al. |
| 10,444,481 | B2 | 10/2019 | Takahashi |
| 11,226,261 | B2 | 1/2022 | Lobachinsky et al. |
| 11,747,137 | B2 | 9/2023 | Eisenberg |
| 2002/0186179 | A1 | 12/2002 | Knowles |
| 2003/0063293 | A1 | 4/2003 | Kitabayashi et al. |
| 2003/0165017 | A1 | 9/2003 | Amitai |
| 2003/0235768 | A1 | 12/2003 | Fincher et al. |
| 2004/0080718 | A1 | 4/2004 | Kojima |
| 2004/0150833 | A1 | 8/2004 | Downs |
| 2005/0281515 | A1 | 12/2005 | Togami et al. |
| 2007/0159673 | A1 | 7/2007 | Freeman et al. |
| 2007/0165192 | A1 | 7/2007 | Prior et al. |
| 2008/0192239 | A1 | 8/2008 | Otosaka |
| 2009/0122414 | A1 | 5/2009 | Amitai |
| 2010/0202048 | A1 | 8/2010 | Amitai et al. |
| 2010/0214635 | A1 | 8/2010 | Sasaki et al. |
| 2010/0214835 | A1 | 8/2010 | Ding et al. |
| 2011/0050547 | A1 | 3/2011 | Mukawa |
| 2011/0176218 | A1 | 7/2011 | Noui |
| 2011/0304828 | A1 | 12/2011 | Khechana et al. |
| 2012/0243002 | A1 | 9/2012 | Yu |
| 2012/0274751 | A1 | 11/2012 | Smith et al. |
| 2013/0022220 | A1 | 1/2013 | Dong et al. |
| 2013/0120224 | A1 | 5/2013 | Cajigas et al. |
| 2014/0334777 | A1 | 11/2014 | Dubroca et al. |
| 2015/0070864 | A1 | 3/2015 | Rainer et al. |
| 2015/0233824 | A1 | 8/2015 | Richards et al. |
| 2015/0253185 | A1 | 9/2015 | Richards et al. |
| 2015/0355481 | A1 | 12/2015 | Hilkes et al. |
| 2016/0012643 | A1 | 1/2016 | Kezele et al. |
| 2016/0062119 | A1 | 3/2016 | Fitch et al. |
| 2016/0202048 | A1 | 7/2016 | Meng et al. |
| 2016/0278695 | A1 | 9/2016 | Wang et al. |
| 2016/0282616 | A1 | 9/2016 | Matsushita |
| 2016/0314564 | A1 | 10/2016 | Jones et al. |
| 2017/0003504 | A1 | 1/2017 | Vallius et al. |
| 2017/0122725 | A1 | 5/2017 | Yeoh et al. |
| 2017/0146802 | A1 | 5/2017 | Pletenetskyy |
| 2017/0169747 | A1 | 6/2017 | Richards et al. |
| 2017/0205277 | A1 | 7/2017 | Ohtsuki |
| 2017/0227764 | A1 | 8/2017 | Kim et al. |
| 2017/0285346 | A1 | 10/2017 | Pan |
| 2017/0307896 | A1 | 10/2017 | Kovaluk et al. |
| 2017/0353714 | A1 | 12/2017 | Poulad et al. |
| 2017/0363799 | A1 | 12/2017 | Ofir et al. |
| 2017/0363885 | A1 | 12/2017 | Blum et al. |
| 2018/0130391 | A1 | 5/2018 | Bohr |
| 2018/0284448 | A1 | 10/2018 | Matsuki et al. |
| 2019/0068944 | A1 | 2/2019 | Zhang et al. |
| 2019/0159354 | A1 | 5/2019 | Zheng et al. |
| 2019/0258054 | A1 | 8/2019 | Yoon |
| 2020/0089001 | A1 | 3/2020 | Amitai et al. |
| 2020/0183170 | A1 | 6/2020 | Amital et al. |
| 2020/0292819 | A1 | 9/2020 | Danziger et al. |
| 2020/0310024 | A1 | 10/2020 | Danziger et al. |
| 2020/0408683 | A1* | 12/2020 | Yamaguchi ........ G01N 15/0211 |
| 2021/0116367 | A1 | 4/2021 | Gelberg et al. |
| 2022/0004014 | A1 | 1/2022 | Ronen et al. |
| 2022/0030205 | A1 | 1/2022 | Danziger |
| 2022/0146839 | A1 | 5/2022 | Miller |
| 2023/0417543 | A1 | 12/2023 | Eisenberg |

FOREIGN PATENT DOCUMENTS

| | | |
|---|---|---|
| CN | 207216158 U | 4/2018 |
| CN | 110207587 A | 9/2019 |
| DE | 202013003898 U | 7/2014 |
| JP | H09304036 A | 11/1997 |
| JP | 2001021448 A | 1/2001 |
| JP | 2003065739 A | 3/2003 |
| JP | 2003232623 A | 8/2003 |
| JP | 2008035146 A | 2/2008 |
| JP | 2010014705 A | 1/2010 |
| JP | 5010964 B2 | 8/2012 |
| JP | 2013231652 A | 11/2013 |
| JP | 2014215141 A | 11/2014 |
| JP | 2016033867 A | 3/2016 |
| WO | 2002099359 A1 | 12/2002 |
| WO | 2007037089 A1 | 4/2009 |
| WO | 2016017085 A1 | 2/2016 |
| WO | 2019131277 A1 | 7/2019 |
| WO | 2021260708 A3 | 2/2022 |
| WO | 2022107140 A1 | 5/2022 |
| WO | 2023007491 A1 | 2/2023 |

OTHER PUBLICATIONS

Klaus Ehrmann et al., "Optical power mapping using paraxial laser scanning", Proceedings vol. 7163, Ophthalmic Technologies XIX; 71631E (2009) https://doi.org/10.1117/12.806765 Event: SPIE BiOS, 2009, San Jose, California, United States.

Erhui Qi et al., "The Application of Pentaprism Scanning Technology on the Manufacturing of M3MP", Proc. of SPIE vol. 9682 96821A-1, downloaded from: http://proceedings.spiedigitallibrary.org/ on Dec. 8, 2016 Terms of Use: http://spiedigitallibrary.org/ss/termsofuse.aspx.

Wei Chen et al., "An Image Quality Evaluation Method of near-eye display", First published: May 25, 2016 https://doi.org/10.1002/sdtp. 10935.

Aramillo-Nunez A. et al., "Measuring the Angles and Pyramidal Error of High-Precision Prisms", Optical Engineering, Soc. of Photo-Optical Instrumentation Engineers, Bellingham, (Oct. 1, 1997), vol. 36, No. 10, doi: 10.1117/1.601516, ISSN 0091-3286, pp. 2868-2871, XP000729477 [A] 1-15 * the whole document * DOI: http://dx.doi.org/10.1117/1.601516.

Jinying Li et al "Improvement of pointing accuracy for Risley prisms by parameter identification" in Applied Optics vol. 56 Issue: 26 pp. 7358-7366 DOI: 10.1364/AO.56.007358 Published: Sep. 10, 2017.

* cited by examiner

TECHNIQUES FOR EXAMINATION OF LIGHT OPTICAL ELEMENTS

FIELD OF THE INVENTION

The present disclosure relates to the field of near eye display systems such as head-mounted displays. More specifically, the present disclosure relates to techniques for examining facets of lightguide optical elements (LOE) of near eye display systems.

BACKGROUND OF THE INVENTION

Consumer demands for improved human-computer interfaces have led to an increased interest in high-quality image head-mounted displays (HMDs) or near-eye displays (NED), commonly known as smart glasses. These devices can provide virtual reality (VR) or augmented reality (AR) experiences, enhancing the way users interact with digital content and their surrounding environment.

Consumers are seeking better image quality, immersive experiences, and greater comfort when using HMDs. They expect displays with high resolution, vibrant colors, and minimal distortion to create a realistic and enjoyable viewing experience.

A critical component in NED systems is the waveguide, which guides light from a system image projector to the user's eyes. Waveguides function based on total internal reflection along their major surfaces to propagate light and use reflection off facets placed along the waveguides to direct the light to the user's eyes. Achieving optimal waveguide performance requires precise design and manufacturing to prevent imperfections that could degrade the user's visual experience.

Assessing the optical performance of a waveguide before integrating it into an NED system can help reduce production costs. Key factors for achieving optimal waveguide performance include ensuring the facets are parallel and have a homogeneous refractive index. Conventionally, testing these characteristics was time-consuming and expensive, which limited the availability and adoption of NED systems.

Therefore, there is a demand for innovative techniques to examine waveguides efficiently.

SUMMARY OF THE INVENTION

The present disclosure introduces innovative techniques for measuring LOE optical performance. Previous methods for measuring facet parallelism in LOE used coupling prisms as disclosed in, for example, U.S. Pat. No. 11,226, 261 and PCT International App. Pub. No. WO2023/007491. In contrast, the techniques disclosed herein do not require coupling prisms. In one embodiment, the LOE is measured by coupling light into the waveguide through one or more of the major surfaces to reflect off or transmit through one or more of the facets. This eliminates the need for a coupling prism, simplifying the measurement system mechanics and improving testing efficiency.

The accompanying drawings, which are incorporated in and constitute a part of the specification, illustrate various example systems, methods, and so on, that illustrate various example embodiments of aspects of the invention. It will be appreciated that the illustrated element boundaries (e.g., boxes, groups of boxes, or other shapes) in the figures represent one example of the boundaries. One of ordinary skill in the art will appreciate that one element may be designed as multiple elements or that multiple elements may be designed as one element. An element shown as an internal component of another element may be implemented as an external component and vice versa. Furthermore, elements may not be drawn to scale.

DETAILED DESCRIPTION

Certain embodiments of the present invention provide a light projecting system and an optical system for achieving optical aperture expansion for the purpose of, for example, head-mounted displays (HMDs) or near-eye displays, commonly known as smart glasses, which may be virtual reality or augmented reality displays. Consumer demands for better and more comfortable human computer interfaces have stimulated demand for better image quality and for smaller devices.

Figure 1:
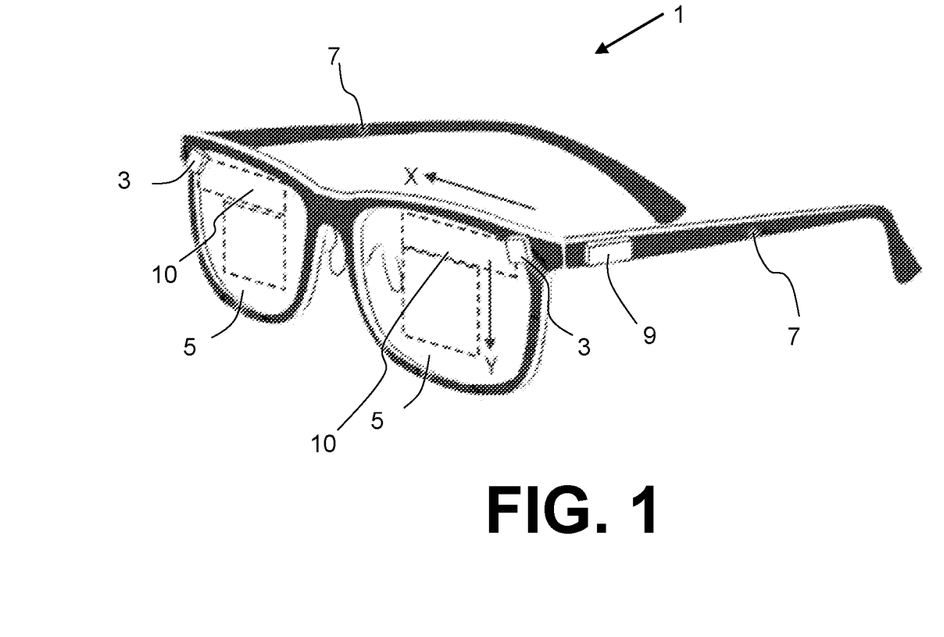
FIG. 1 illustrates an exemplary implementation of a near-eye display device.

FIG. 1 illustrates an exemplary implementation of a near-eye display device 1. The near-eye display device 1 is disclosed here merely as an example and the inventive techniques disclosed herein are not limited to such devices.

In the illustrated embodiment of FIG. 1, the near-eye display 1 employs compact image projectors or projection units 3 optically coupled so as to inject an image into light optical elements (LOE) 10. Optical aperture expansion of light from the projection unit 3 may be achieved within LOE 10 by one or more arrangements for progressively redirecting the image illumination employing a set of partially reflecting surfaces (interchangeably referred to as "facets") that are ideally parallel to each other and inclined obliquely to the direction of propagation of the image light, with each successive facet deflecting a proportion of the image light into a deflected direction. Partially reflecting facets may also work as a coupling-out arrangement that progressively couples out a proportion of the image illumination towards the eye of an observer located within a region defined as the eye-motion box (EMB).

The overall device 1 is preferably supported relative to the head of a user with each projection unit 3 and LOE 10 serving a corresponding eye of the user. In one particularly preferred option as illustrated here, a support arrangement is implemented as a face-mounted set of lenses (e.g., Rx lenses, sunglasses, etc., referred colloquially herein as "eye glasses" or "smart glasses") with lenses 5 to which the projection unit 3 and LOE 10 are optically connected and a frame with sides 7 for supporting the device relative to ears of the user. Other forms of support arrangement may also be used, including but not limited to, head bands, visors or devices suspended from helmets.

The near-eye display 1 may include various additional components, typically including a controller 9 for actuating the projection unit 3, typically employing electrical power from a small onboard battery (not shown) or some other suitable power source. Controller 9 may include all necessary electronic components such as processing unit or processing circuitry to drive the image projector 3.

Figure 2:
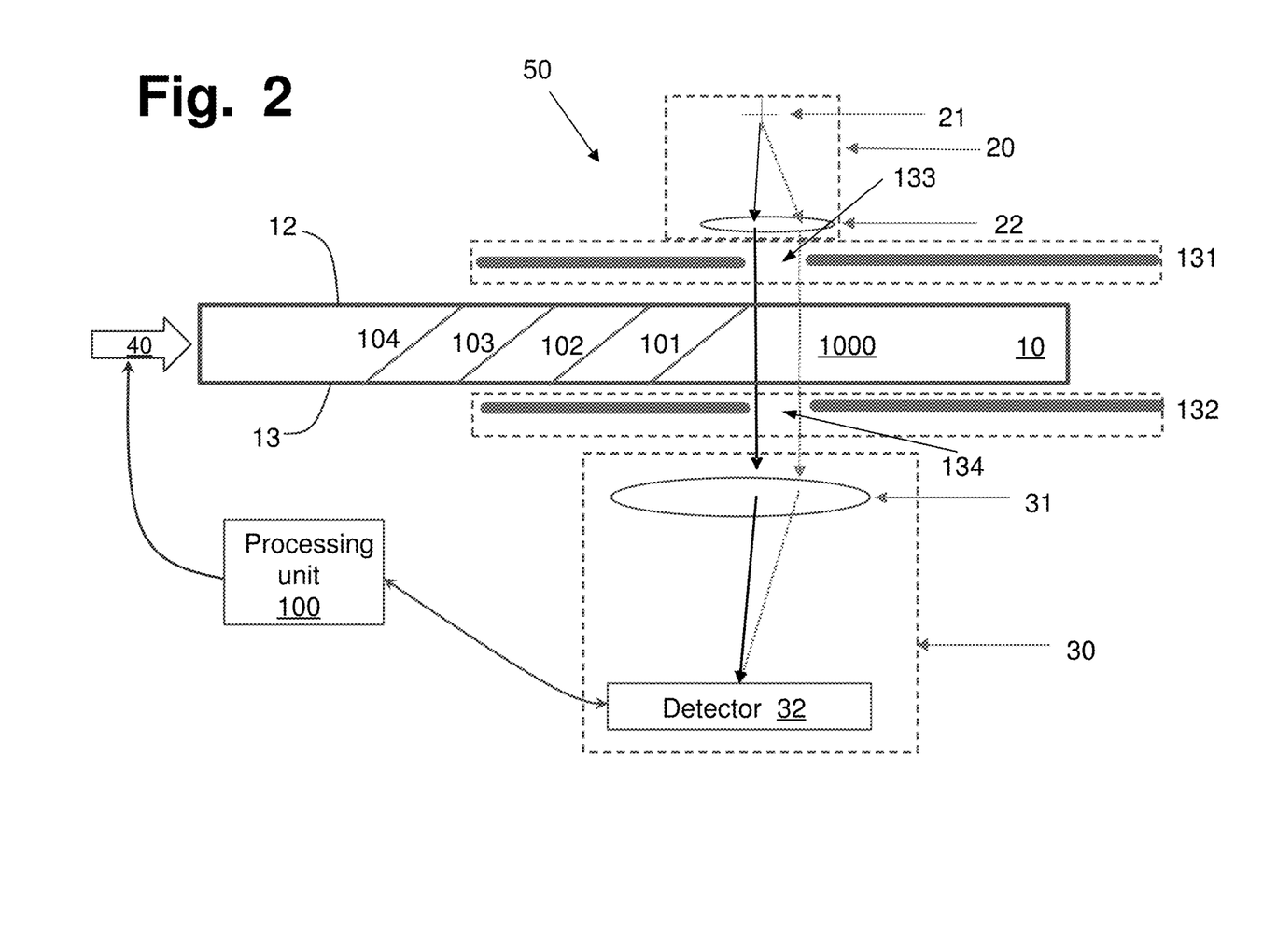
FIG. 2 illustrates a schematic diagram of an exemplary system for measuring parallelism of partially reflecting facets of an LOE.

FIG. 2 illustrates a schematic diagram of a system 50 for measuring parallelism of partially reflecting facets 101-104 of an LOE 10. The system 50 may include a display-collimator (imaging its image at infinity) section 20 including an imaging collimator 21 and a collimating lens 22, two devices 131, 132 having respective slits 133, 134 formed thereon, and a collimating image acquisition section 30 including a lens 31 and a detector 32. System 50 may also include a processing unit 100 that may control one or more of the display-collimator section 20, the image acquisition section 30, and the devices 131, 132. The processing unit 100 may also control machinery 40 for moving (i.e., controlling the lateral positioning of) the LOE 10 under examination relative to the other elements of the system 50.

The processing unit 100 may include one or more processors (such as, for example, microprocessors, microcontrollers, etc.), memory, etc. programmed (e.g., software, firmware, etc.) to control various of the elements of the systems disclosed herein and for calculating/deducing parallelism and homogeneity of refractive index of the LOE facets.

As shown in FIG. 2, the devices 131, 132 may be placed such that their respective slits 133, 134 are disposed across from each other with the LOE 10 therebetween so an image projected by the display-collimator section 20 reaches the image acquisition section 30, specifically the detector 32, without any angular shift caused by the LOE facets 101-104. This can be used to calibrate the system 50 as a reference for the position of the image for an ideal pair of parallel facets.

Figure 3:
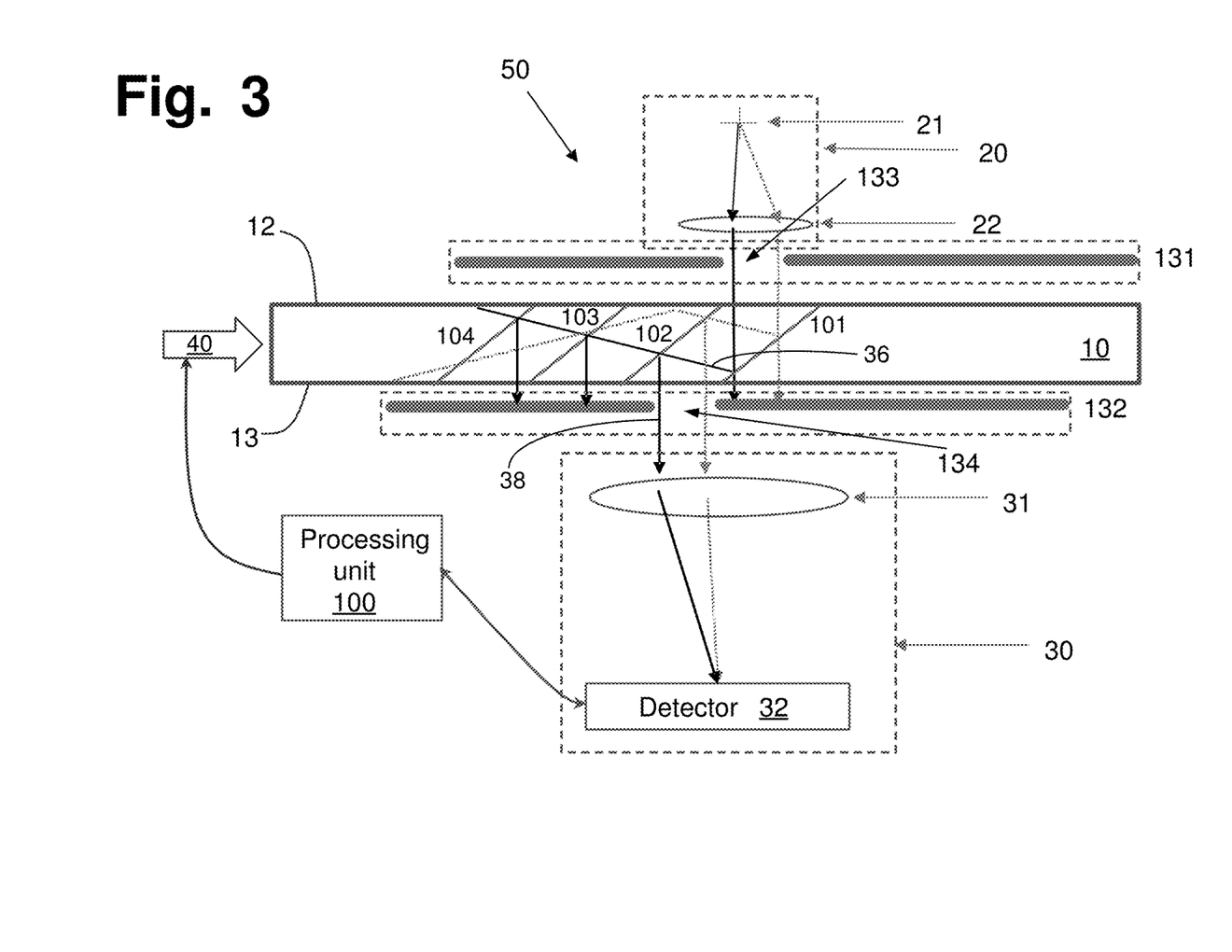
FIG. 3 illustrates a schematic diagram of an exemplary system for measuring parallelism of partially reflecting facets of an LOE.

FIG. 3 illustrates a schematic diagram of system 50 with both the device 132 and the LOE 10 shifted from their positions shown in FIG. 2. The slits 133 and 134 of devices 131 and 132, respectively, are placed such that the direct image projected by the display-collimator section 20 reaches facet 101. Any light transmitted by facet 101 is blocked from reaching the image acquisition section 30. Light 36 reflected by facet 101 reaches facet 102, which reflects some of the light 38 to the image acquisition section 30. Light 38 reaching the detector 32 corresponds to light that has been twice reflected, first by the facet 101 (light 36) and second by the facet 102 (light 38). By measuring the shift of the detected image captured at detector 32 in the arrangement of FIG. 3 relative to the image captured in the arrangement shown in FIG. 2, the system 50 may deduce the parallelism between surfaces 101 and 102.

Figure 4:
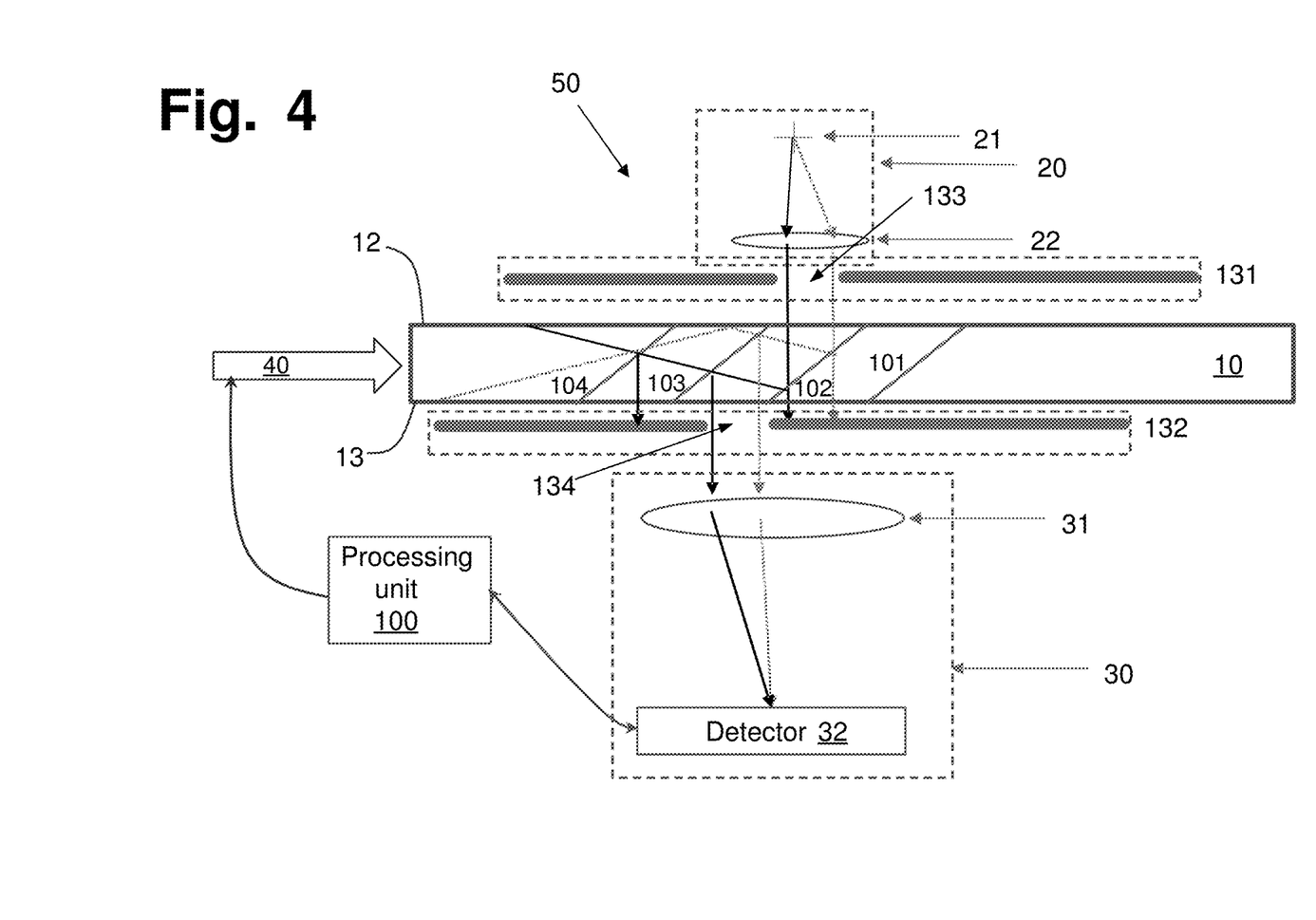
FIG. 4 illustrates a schematic diagram of an exemplary system for measuring parallelism of partially reflecting facets of an LOE.

FIG. 4 illustrates a schematic diagram of system 50 with the LOE 10 shifted from its position shown in FIG. 3 to, in this arrangement, measure parallelism between surfaces 102 and 103. The slits 133 and 134 of devices 131 and 132, respectively, are placed such that the direct image projected by the display-collimator section 20 reaches the facet 102. Any light transmitted by facet 102 is blocked from reaching the image acquisition section 30. Light reflected by facet 102 reaches facet 103, which reflects some of the light to the image acquisition section 30. Light reaching detector 32 corresponds to light that has been twice reflected, first by the facet 102 and second by the facet 103. By measuring the shift of the detected image captured at detector 32 in the arrangement of FIG. 4 relative to the image captured in the arrangement shown in FIG. 2, the system 50 may deduce the parallelism between surfaces 102 and 103. With the information of FIGS. 2, 3, and 4, system 50 may also deduce parallelism between facets 101 and 103 by simple mathematical calculation.

For instance, suppose that the image detected in the arrangement where the two slits 133 and 134 are facing one another (as in FIG. 2) is centered around the zero position, for the arrangement shown in FIG. 3 the center of the image is shifted 20" to the left, and for the situation presented in FIG. 4 the image is positioned 20" to the right. From those measurements, the system 50 can deduce that facets 101 and 102 are parallel and facet 101 is rotated 6.66" clockwise if the material of the LOE has an index of refraction of 1.5 according to the equation $\alpha=\theta/2n$ where a Is the mechanical deviating angle between two facets ($\alpha=\theta$ means perfect parallelism), $\theta$ is the observed angular image shift and n is the refractive index of the LOE.

By continuing shifting the entire LOE 10 such that all its facets had their turn in front of the slit 134 of the device 132, the system 50 can deduce the parallelism of the entire facets structure.

Figure 5:
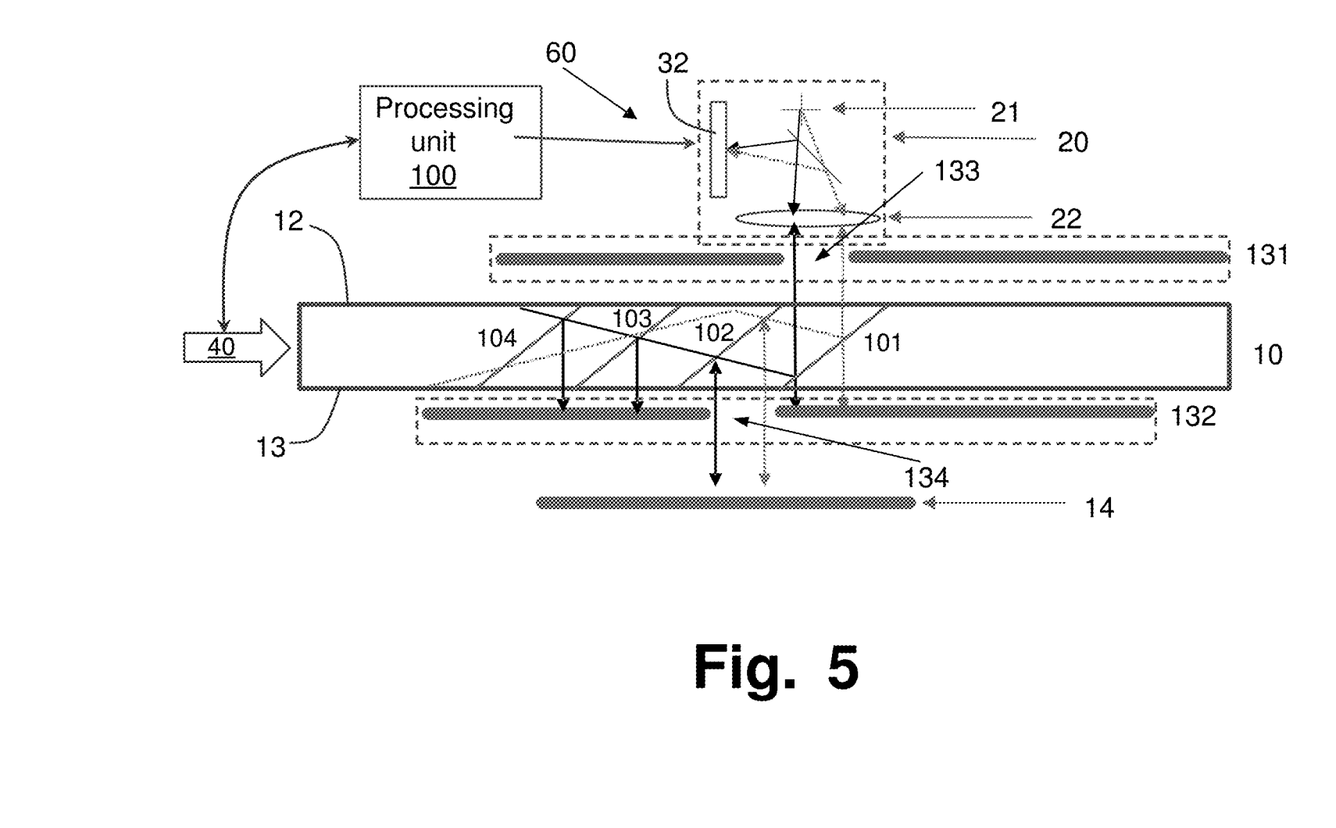
FIG. 5 illustrates a schematic diagram of an exemplary system for measuring parallelism of partially reflecting facets of an LOE.

A similar technique may be implemented using system 60 of FIG. 5. In system 60, the display-collimator section 20 includes an auto collimator and replaces the imaging collimator 30 of the previous figures with a mirror 14. The slit 134 of the device 132 is disposed optically between the second major surface 13 and the mirror 14 such that light from the projector 20 travels through the slit 133 of the device 131 to the first major surface 12 and to a first facet 101, light reflected by the first facet 101 and a second facet 102 travels from the second facet 102 to the second major surface 13 and through the slit 134 of the second device 132 to the mirror 14. Light reflected by the mirror 14 travels through the second slit 134 of the device 132 to the second major surface 13 and to the second facet 102, light reflected by the second facet 102 and the first facet 101 travels from the first facet 101 to the first major surface 12 and through the first slit 133 of the device 131 to the detector 32. Light reaching detector 32 would have traveled via the two relevant facets twice and, thus, the intensity of light received at the detector 32 is significantly decreased from the originally projected light.

Figure 6:
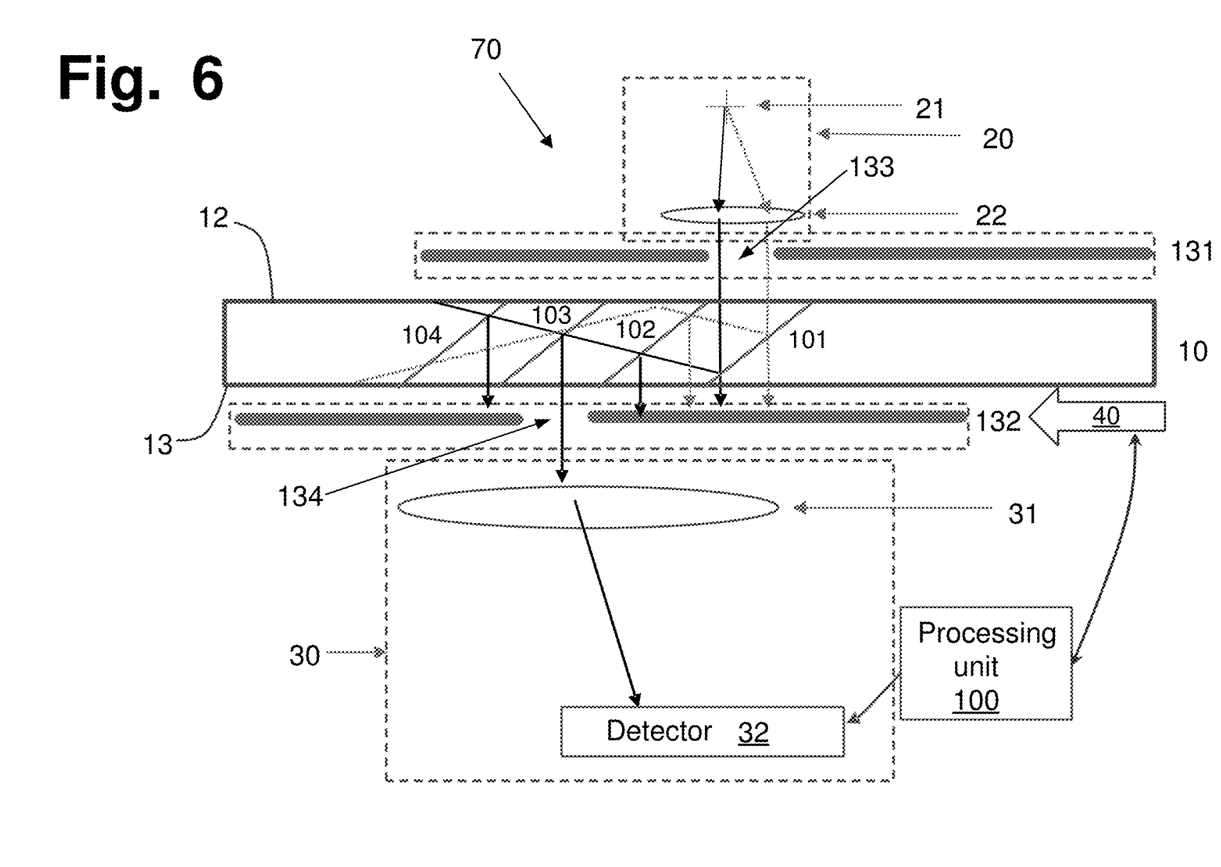
FIG. 6 illustrates a schematic diagram of an exemplary system for measuring parallelism of partially reflecting facets of an LOE.

Any kind of structure where one measures the reflection deviation of light hitting at least one pair of facets in the array could be considered. For instance, one could measure the reflection of light between a first facet i and i+2 instead of i+1 or even measure the reflection of light between a first facet i and i+n where n is a shifting integer between 1 and N−1 where N is the total number of facets. An exemplary system 70 is shown in FIG. 6 where the slit 134 of the device 132 is positioned in front of facet 103 and could be shifted to facet 104.

Figure 7:
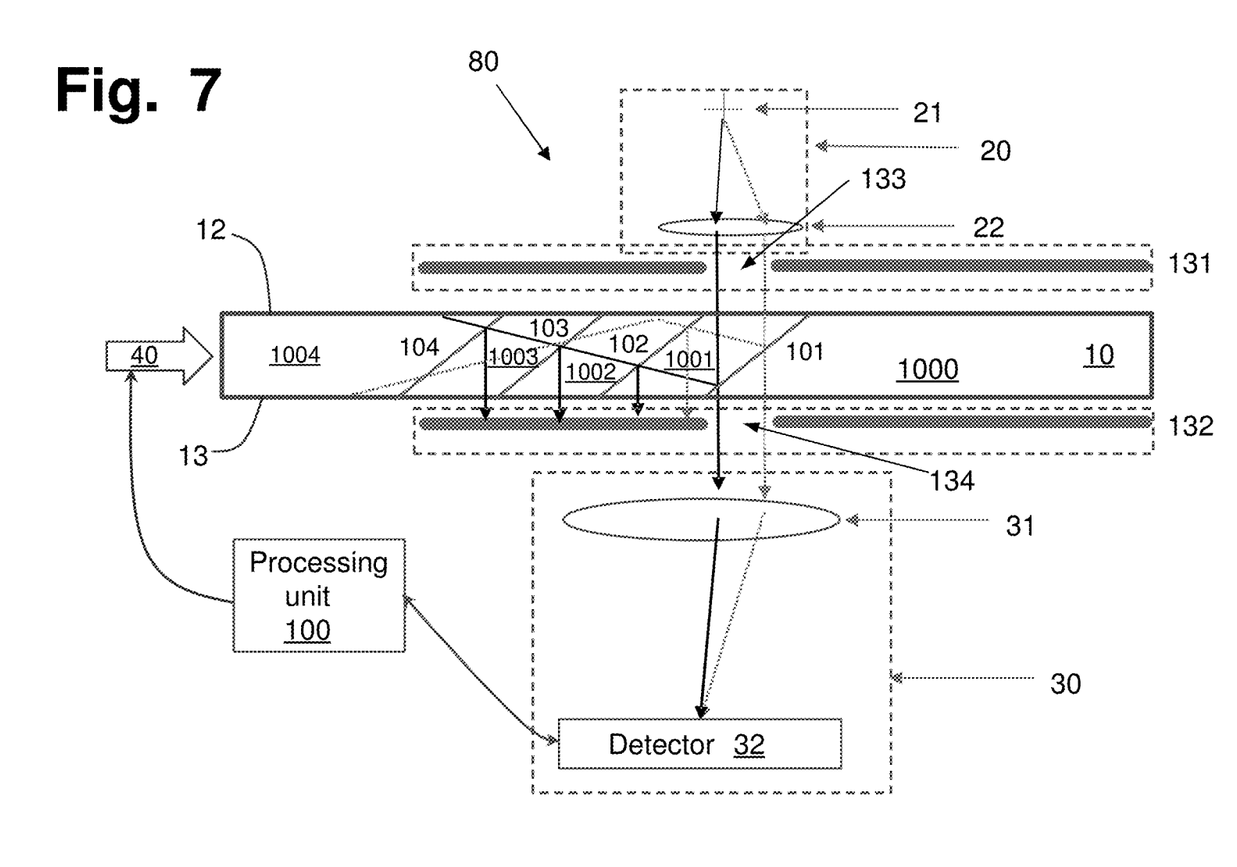
FIG. 7 illustrates a schematic diagram of an exemplary system for measuring homogeneity of refractive index of facets of an LOE.

FIG. 7 illustrates a system 80 for measuring homogeneity of refractive index of facets 101-104 of the LOE 10. The LOE 10 may be manufactured from individual coated plates or slices 1000-1004 glued together. The interfaces between adjacent plates form the facets. For example, the interface between adjacent plates 1000 and 1001 form the facet 101. The quality of the LOE 10 will be governed, not just by how parallel the facets 101-104 may be, but also by homogeneity in the refractive index of the plates 1000-1004 at the interfaces forming the facets 101-104.

To measure homogeneity of refractive index of facets 101-104 the devices 131, 132 may be placed such that their slits 133, 134 face one another as in FIGS. 1 and 7. The calibration of the system takes place in the arrangement as showed in FIG. 1, where LOE 10 is placed relative to the devices 131, 132 such that projected light propagates through the LOE 10 through a single slice 1000 without crossing different plates along the path. That is, in calibration, light from the imaging unit 20 is transmitted normal to the first and second major surfaces 12, 13 through a portion 1000 of the LOE 10 not including a facet.

To measure homogeneity of refractive index of facet 101 the devices 131, 132 remain placed such that their slits 133, 134 face one another. However, as shown in FIG. 7, the LOE 10 has been shifted left such that projected light enters the LOE 10 through the first major surface 12 at slice or plate 1001 and then crosses the interface between the plate 1001 and the plate 1000 (i.e., the facet 101). If the refractive index of plates 1001 and 1000 is not the same at the interface 101, then, according to Snell law, there will be deflection of the light rays as the light crosses the interface between the two surfaces that can be measure using the arrangement of FIG. 7.

By further shifting the LOE 10 left, the interfaces between plates 1002 and 1001, 1002 and 1003, etc. may be examined such that differences in the refractive index of the facets 102, 103, etc. may be detected. Assuming that the light enters normally to the major surface 12 of the LOE 10 and exits at the angle $\beta$, then we can deduce that $\Delta n = n1/n2 - 1 = \cot(\theta)/n2\beta$ where $\theta$ is the slanting angle of the facets ($\theta=0$ means that the facets are parallel to the major surfaces of the LOE 10, in the figures $\theta$ equals 38 degrees).

Methods

Figure 8:
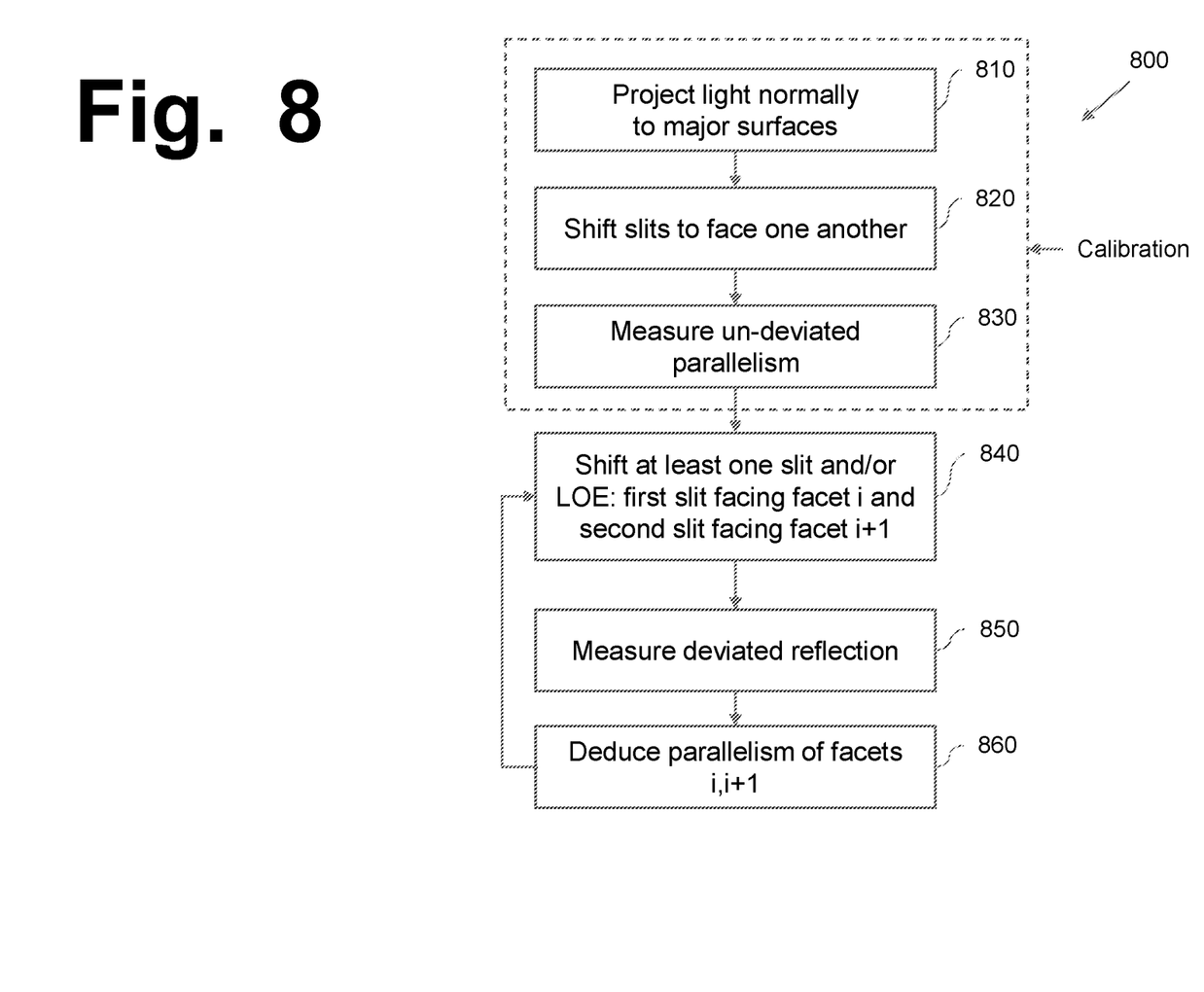
FIG. 8 illustrates a flow chart of an exemplary process for measuring parallelism of partially reflecting facets of an LOE.
Figure 9:
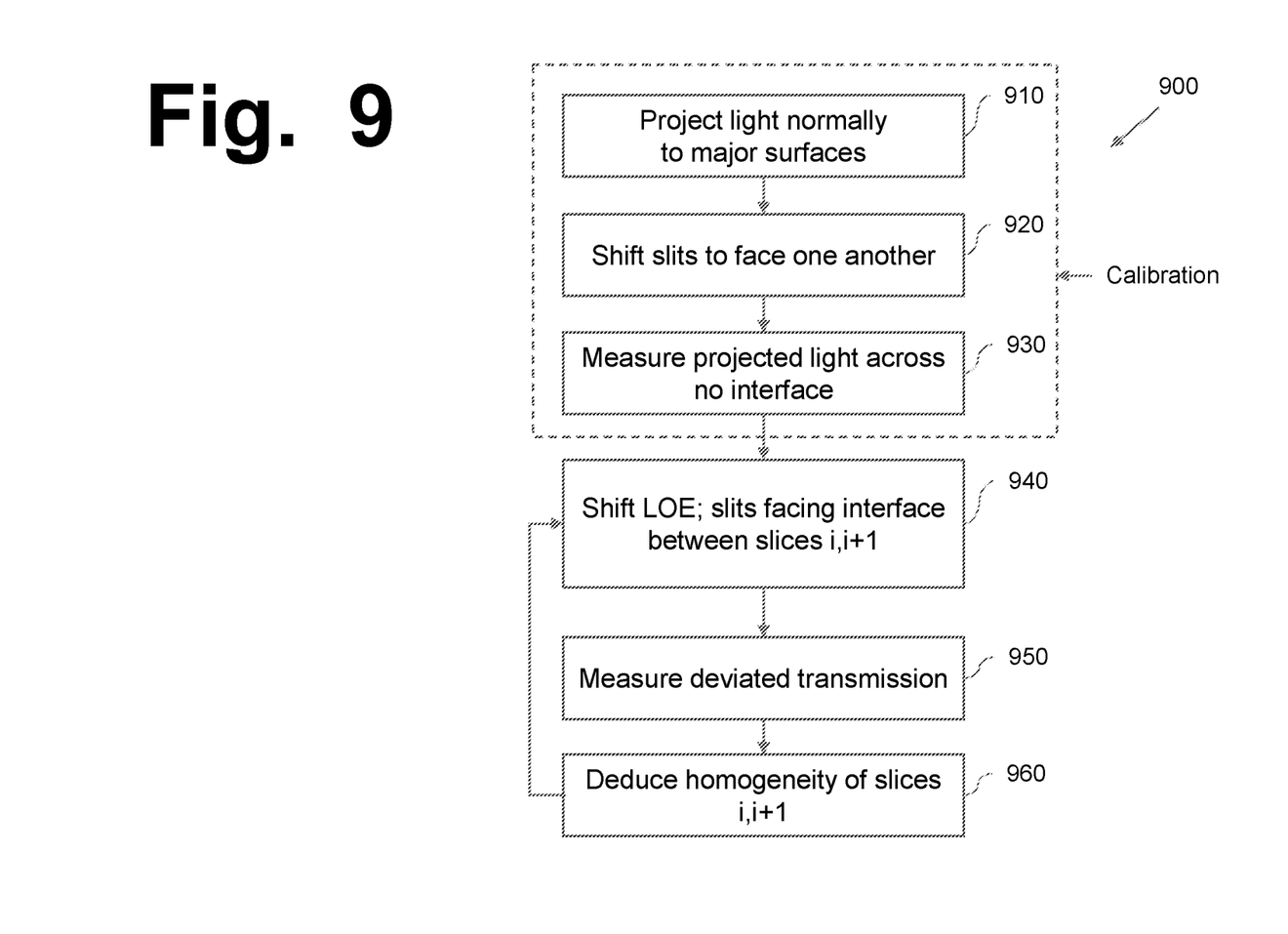
FIG. 9 illustrates a flow chart of an exemplary process for measuring homogeneity of refractive index of facets of an LOE.

Exemplary methods may be better appreciated with reference to the flow diagrams of FIGS. 8 and 9. While for purposes of simplicity of explanation, the illustrated methodologies are shown and described as a series of blocks, it is to be appreciated that the methodologies are not limited by the order of the blocks, as some blocks can occur in different orders or concurrently with other blocks from that shown and described. Moreover, less than all the illustrated blocks may be required to implement an exemplary methodology. Furthermore, additional methodologies, alternative methodologies, or both can employ additional blocks, not illustrated.

In the flow diagrams, blocks denote "processing blocks" that may be implemented with logic. The processing blocks may represent a method step or an apparatus element for performing the method step. The flow diagrams do not depict syntax for any particular programming language, methodology, or style (e.g., procedural, object-oriented). Rather, the flow diagrams illustrate functional information one skilled in the art may employ to develop logic to perform the illustrated processing. It will be appreciated that in some examples, program elements like temporary variables, routine loops, and so on, are not shown. It will be further appreciated that electronic and software applications may involve dynamic and flexible processes so that the illustrated blocks can be performed in other sequences that are different from those shown or that blocks may be combined or separated into multiple components. It will be appreciated that the processes may be implemented using various programming approaches like machine language, procedural, object oriented or artificial intelligence techniques.

FIG. 8 illustrates a flow diagram for an exemplary method 800 for measuring parallelism of facets of an LOE. As shown in FIG. 8, the method 800 may include calibration by, at 810, projecting light normally to the major surfaces of the LOE, at 820, shifting one or more of the slits 133, 134 to face each other across a portion of the LOE that does not include a facet, and, at 830, measuring the projected light to measure un-deviated parallelism.

At 840, the method 800 may include shifting at least one slit 133, 134 and/or the LOE such that light from the projector travels through the first slit 133 to the first major surface and to a first facet (facet i) and such that the second slit 134 blocks light transmitted by the first facet and such that light reflected by the first facet to a second facet travels from the second facet to the second major surface and through the second slit 134 to the detector. At 850, the method 800 may include measuring the deviated reflection from the image as detected by the detector relative to light transmitted normal to the first and second major surfaces through a portion of the substrate not including a facet. At 860, the method 800 may include deducing the parallelism between the first facet and the second facet based on the measured deviation. The method may then repeat for further facets down the LOE.

FIG. 9 illustrates a flow diagram for an exemplary method 900 for measuring homogeneity of refractive index of facets of the LOE. As shown in FIG. 9, the method 900 may include calibration by, at 910, projecting light normally to the major surfaces of the LOE, at 920, shifting one or more of the slits 133, 134 to face each other across a portion of the LOE that does not include a facet, and, at 930, measuring the projected light across the portion of the LOE that does not include a facet.

At 940, the method 900 may include shifting at least one slit 133, 134 and/or the LOE such that light from the projector travels through the first slit 133 to the first major surface and to a first facet of the facets and light transmitted through the first facet travels from the first facet to the second major surface and through the second slit 134 to the detector. At 950, method 900 may include measuring light transmission as deviated by the first facet. At 960, the method 900 may include deducing homogeneity of slices based on the measured deviated light transmission relative to the light transmitted normal to the first and second major surfaces through the portion of the LOE not including a facet.

While the figures illustrate various actions occurring in serial, it is to be appreciated that various actions illustrated could occur substantially in parallel, and while actions may be shown occurring in parallel, it is to be appreciated that these actions could occur substantially in series. While a number of processes are described in relation to the illustrated methods, it is to be appreciated that a greater or lesser number of processes could be employed, and that lightweight processes, regular processes, threads, and other approaches could be employed. It is to be appreciated that other exemplary methods may, in some cases, also include actions that occur substantially in parallel. The illustrated exemplary methods and other embodiments may operate in real-time, faster than real-time in a software or hardware or hybrid software/hardware implementation, or slower than real time in a software or hardware or hybrid software/hardware implementation.

Definitions

The following includes definitions of selected terms employed herein. The definitions include various examples or forms of components that fall within the scope of a term and that may be used for implementation. The examples are not intended to be limiting. Both singular and plural forms of terms may be within the definitions.

An "operable connection," or a connection by which entities are "operably connected," is one in which signals, physical communications, or logical communications may be sent or received. Typically, an operable connection includes a physical interface, an electrical interface, or a data interface, but it is to be noted that an operable connection may include differing combinations of these or other types of connections sufficient to allow operable control. For example, two entities can be operably connected by being able to communicate signals to each other directly or through one or more intermediate entities like a processor, operating system, a logic, software, or other entity. Logical or physical communication channels can be used to create an operable connection.

To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the detailed description or claims (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

While example systems, methods, and so on, have been illustrated by describing examples, and while the examples have been described in considerable detail, it is not the intention of the applicants to restrict or in any way limit scope to such detail. It is, of course, not possible to describe every conceivable combination of components or methodologies for purposes of describing the systems, methods, and so on, described herein. Additional advantages and modifications will readily appear to those skilled in the art. Therefore, the invention is not limited to the specific details, the representative apparatus, and illustrative examples shown and described. Thus, this application is intended to embrace alterations, modifications, and variations that fall within the scope of the appended claims. Furthermore, the preceding description is not meant to limit the scope of the invention. Rather, the scope of the invention is to be determined by the appended claims and their equivalents.

What is claimed is:

1. A system for measuring parallelism and homogeneity of refractive index of facets of a lightguide optical element (LOE), the LOE including a light-transmitting substrate having first and second major surfaces parallel to each other such that light coupled into the light-transmitting substrate is trapped between the first and second major surfaces by total internal reflection and the facets configured to couple the light out of the substrate, the system comprising:

a processing unit configured to control at least one of a first slit and a second slit such that the first slit is disposed optically between a projector configured to emit light corresponding to an image and the first major surface, the first slit disposed such that light from the projector travels through the first slit to the first major surface and to a first facet of the facets and such that the second slit is disposed optically between the second major surface and a detector, the second slit disposed as to block light transmitted by the first facet and such that light reflected by the first facet and a second facet, from the facets, travels from the second facet to the second major surface and through the second slit to the detector;

the processing unit configured to deduce the parallelism between the first facet and the second facet based on a shift of the image as detected by the detector relative to light transmitted normal to the first and second major surfaces through a portion of the substrate not including a facet from the facets;

the processing unit configured to control the at least one of the first slit and the second slit such that the second slit is disposed optically between the second major surface and the detector such that light from the projector travels through the first slit to the first major surface and to the first facet and light transmitted through the first facet travels from the first facet to the second major surface and through the second slit to the detector; and the processing unit configured to determine the homogeneity or deviation in refractive index between surfaces of the first facet based on the light transmitted through the first facet, as detected by the detector, relative to light transmitted normal to the first and second major surfaces through a portion of the substrate not including a facet from the facets.

2. The system of claim 1, the processing unit configured to control lateral movement of the LOE relative to the first and second slits, or viceversa, to measure parallelism and homogeneity of refractive index of additional facets of the LOE.

3. The system of claim 1, the processing unit configured to calibrate by capturing at the detector an image emitted by the projector that travels through the portion of the substrate not including a facet.

4. The system of claim 1, comprising:

a mirror, the second slit disposed optically between the second major surface and the mirror such that light from the projector travels through the first slit to the first major surface and to a first facet, light reflected by the first facet and a second facet travels from the second facet to the second major surface and through the second slit to the mirror, light reflected by the mirror travels through the second slit to the second major surface and to the second facet, light reflected by the second facet and the first facet travels from the first facet to the first major surface and through the first slit to the detector.

5. The system of claim 1, wherein
the projector includes a collimator and the detector includes a camera, or
the projector and the detector are part of an autocollimator.

6. A system for measuring parallelism of facets of a lightguide optical element (LOE), the LOE including a light-transmitting substrate having first and second major surfaces parallel to each other such that light coupled into the light-transmitting substrate is trapped between the first and second major surfaces by total internal reflection and the facets configured to couple the light out of the substrate, the system comprising:

a processing unit configured to control at least one of a first slit and a second slit such that the first slit is disposed optically between a projector configured to emit light corresponding to an image and the first major surface, the first slit disposed such that light from the projector travels through the first slit to the first major surface and to a first facet of the facets and such that the second slit is disposed optically between the second major surface and a detector, the second slit disposed as to block light transmitted by the first facet and such that light reflected by the first facet and a second facet, from the facets, travels from the second facet to the second major surface and through the second slit to the detector; and the processing unit configured to deduce the parallelism between the first facet and the second facet based on a shift of the image as detected by the detector relative to light transmitted normal to the first and second major surfaces through a portion of the substrate not including a facet from the facets.

7. The system of claim 6, the processing unit configured to laterally move the LOE relative to the first and second slits, or viceversa, to measure parallelism of additional facets of the LOE.

8. The system of claim 6, the processing unit configured to calibrate by capturing at the detector an image emitted by the projector that travels through a portion of the substrate not including a facet.

* * * * *